(12) United States Patent
Lee et al.

(10) Patent No.: US 11,305,621 B2
(45) Date of Patent: Apr. 19, 2022

(54) VEHICLE DISPLAY SYSTEM WITH REFLECTION CONTROL

(71) Applicant: Gentex Corporation, Zeeland, MI (US)

(72) Inventors: Ethan J. Lee, Byron Center, MI (US); John A. VanderPloeg, Zeeland, MI (US); Andrew D. Weller, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 150 days.

(21) Appl. No.: 16/693,923

(22) Filed: Nov. 25, 2019

(65) Prior Publication Data

US 2020/0164725 A1 May 28, 2020

Related U.S. Application Data

(60) Provisional application No. 62/771,310, filed on Nov. 26, 2018.

(51) Int. Cl.
| | |
|---|---|
| *B60J 3/06* | (2006.01) |
| *G02F 1/157* | (2006.01) |
| *G02F 1/1335* | (2006.01) |
| *G02F 1/163* | (2006.01) |
| *B60R 11/02* | (2006.01) |

(Continued)

(52) U.S. Cl.
CPC ............. *B60J 3/06* (2013.01); *B60R 11/0235* (2013.01); *G02F 1/133536* (2013.01); *G02F 1/157* (2013.01); *G02F 1/163* (2013.01); *B60J 7/043* (2013.01); *B60R 2011/0026* (2013.01); *B60R 2011/0033* (2013.01); *G02F 1/1336* (2013.01); *G02F 1/133531* (2021.01); *G02F 2201/44* (2013.01); *G02F 2203/02* (2013.01)

(58) Field of Classification Search
CPC ......... B60J 3/06; B60J 7/043; B60R 11/0235; B60R 2011/0026; B60R 2011/0033; G02F 1/133536; G02F 1/157; G02F 1/163; G02F 1/133531; G02F 1/1336; G02F 2201/44; G02F 2203/02
USPC ....................................................... 359/267
See application file for complete search history.

(56) References Cited

U.S. PATENT DOCUMENTS

| | | |
|---|---|---|
| 5,405,184 A | 4/1995 | Jardin et al. |
| 5,928,572 A | 7/1999 | Tonar et al. |

(Continued)

FOREIGN PATENT DOCUMENTS

| | | |
|---|---|---|
| WO | 9842796 | 10/1998 |
| WO | 9902621 | 1/1999 |

*Primary Examiner* — Nathanael R Briggs
*Assistant Examiner* — William D Peterson
(74) *Attorney, Agent, or Firm* — Price Heneveld LLP; Brian James Brewer

(57) ABSTRACT

A display system for a vehicle comprises a display device disposed inside a passenger compartment of the vehicle. The passenger compartment is configured to receive light from a first polarization filter disposed on a light-transmissive panel of the vehicle. The first polarization filter is oriented in a first orientation and the display device is configured to display video data from a display screen. The display device comprises an electro-optic element comprising a plurality of substrates and a second polarization filter disposed on at least one of the plurality of substrates. The second polarization filter is oriented in a second orientation parallel to the first orientation.

18 Claims, 4 Drawing Sheets

(51) Int. Cl.
    *B60R 11/00*      (2006.01)
    *G02F 1/13357*    (2006.01)
    *B60J 7/043*      (2006.01)

(56)            References Cited

U.S. PATENT DOCUMENTS 5,998,617  A    12/1999  Srinivasa et al.
    6,020,987  A     2/2000  Baumann et al.
    6,037,471  A     3/2000  Srinivasa et al.
    6,137,620  A    10/2000  Guarr et al.
    6,141,137  A    10/2000  Byker et al.
    6,193,912  B1    2/2001  Thieste et al.
    6,241,916  B1    6/2001  Claussen et al.
    6,249,369  B1    6/2001  Theiste et al.
    6,519,072  B2    2/2003  Nishikitani et al.
    6,572,233  B1    6/2003  Northman et al.
    8,201,800  B2    6/2012  Filipiak
    8,210,695  B2    7/2012  Roth et al.
    8,237,909  B2    8/2012  Ostreko et al.
    8,264,761  B2    9/2012  Cammenga et al.
    8,339,526  B2   12/2012  Minikey, Jr. et al.
    8,411,245  B2    4/2013  Lee et al.
    8,643,931  B2    2/2014  Cammenga et al.
    8,646,924  B2    2/2014  Roth et al.
    8,814,373  B2    8/2014  Steel et al.
    8,827,517  B2    9/2014  Cammenga et al.
    8,885,240  B2   11/2014  Roth et al.
    8,925,891  B2    1/2015  Van Huis et al.
    9,174,577  B2   11/2015  Busscher et al.
   10,112,540  B2   10/2018  Minikey, Jr. et al.
 2017/0320441  A1*  11/2017  Luten .................... B60R 1/088
 2018/0101079  A1    4/2018  Tonar

* cited by examiner

VEHICLE DISPLAY SYSTEM WITH REFLECTION CONTROL

CROSS-REFERENCE TO RELATED APPLICATIONS

This application claims priority under 35 U.S.C. § 119(e) and the benefit of U.S. Provisional Application No. 62/771,310 entitled VIDEO MIRROR WITH SUNROOF, filed on Nov. 26, 2018, by Ethan J. Lee et al., the entire disclosure of which is incorporated herein by reference.

TECHNOLOGICAL FIELD

The present disclosure relates generally to a display device and, more particularly, relates to a display device for a vehicle configured to control reflections of environmental light.

SUMMARY

In one aspect of the disclosure, a display system for a vehicle is disclosed. The display system comprises a display device disposed inside a passenger compartment of the vehicle. The passenger compartment is configured to receive light from a first polarization filter disposed on a light-transmissive panel of the vehicle. The first polarization filter is oriented in a first orientation and the display device is configured to display video data from a display screen. The display device comprises an electro-optic element comprising a plurality of substrates and a second polarization filter disposed on at least one of the plurality of substrates. The second polarization filter is oriented in a second orientation parallel to the first orientation.

In another aspect of the disclosure, a method for displaying visual information on a display disposed in a passenger compartment of a vehicle is disclosed. The method comprises receiving filtered light having a first polarization in the passenger compartment from a light-transmissive panel. The method further comprises receiving the filtered light of the first polarization at a display surface of a display device in the passenger compartment. The method further comprises transmitting the filtered light having the first polarization through a first polarization filter of an electrochromic element of the display and reflecting the filtered light from a mirror element of the display as reflected light. The method further comprises inhibiting the transmission of the reflected light into the passenger compartment by blocking the reflected light with the first polarization filter.

In yet another aspect of the disclosure, a display system for a vehicle is disclosed. The display system comprises a light-transmissive panel of the vehicle comprising a first polarization filter oriented in a first orientation. A display device is disposed inside a passenger compartment of the vehicle and configured to display video data on a display screen. The display device comprises an electro-optic element. The electro-optic element comprises a first substrate comprising a first surface and a second surface and a second substrate comprising a third surface and a fourth surface. An electro-optic medium is disposed between the first substrate and the second substrate. A second polarization filter is disposed on at least one of the first surface and the third surface. The second orientation of the second polarization filter is arranged parallel to the first orientation of the first polarization filter.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which.

DETAILED DESCRIPTION OF EMBODIMENTS

Figure 1:
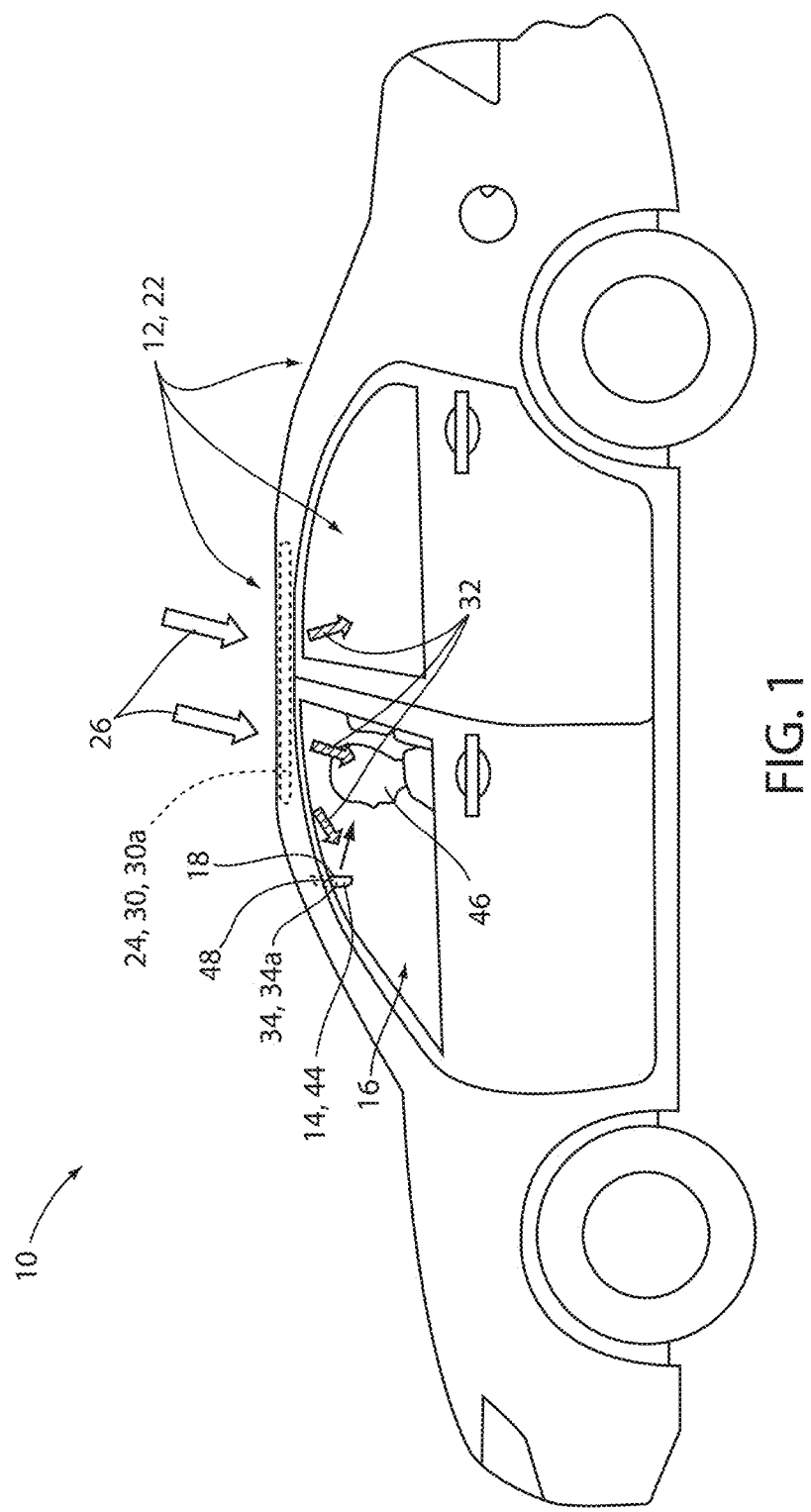
FIG. 1 is a side profile view of a vehicle comprising a sunroof and at least one display device disposed in a passenger compartment.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of a display mirror, and the term "rear" shall refer to the surface of the element further from the intended viewer of the display mirror. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIG. 1, a side profile view of a vehicle 10 comprising a light-transmissive panel 12 and at least one display device 14 is shown. As illustrated, the display device 14 is shown disposed in a passenger compartment 16 of the vehicle 10 and may correspond to a rearview display device. In various embodiments, the display device 14 may provide for improved visibility of video information displayed on a screen 18. For example, in some embodiments, the disclosure may provide for a reduction in reflections and related artifacts that may result from light impinging upon the screen 18. The reduction of the reflections may be provided by a novel combination of light filters applied to the light-transmissive panel 12 in the form of one or more windows 22, which may include a sunroof 24 or various widows of the vehicle 10. For clarity, the disclosure provides for various examples of the display device 14 in reference to light filters incorporated in the sunroof 24. However, it shall be understood that the apparatuses and related methods disclosed herein may similarly be implemented in any of the windows 22.

Figure 2:
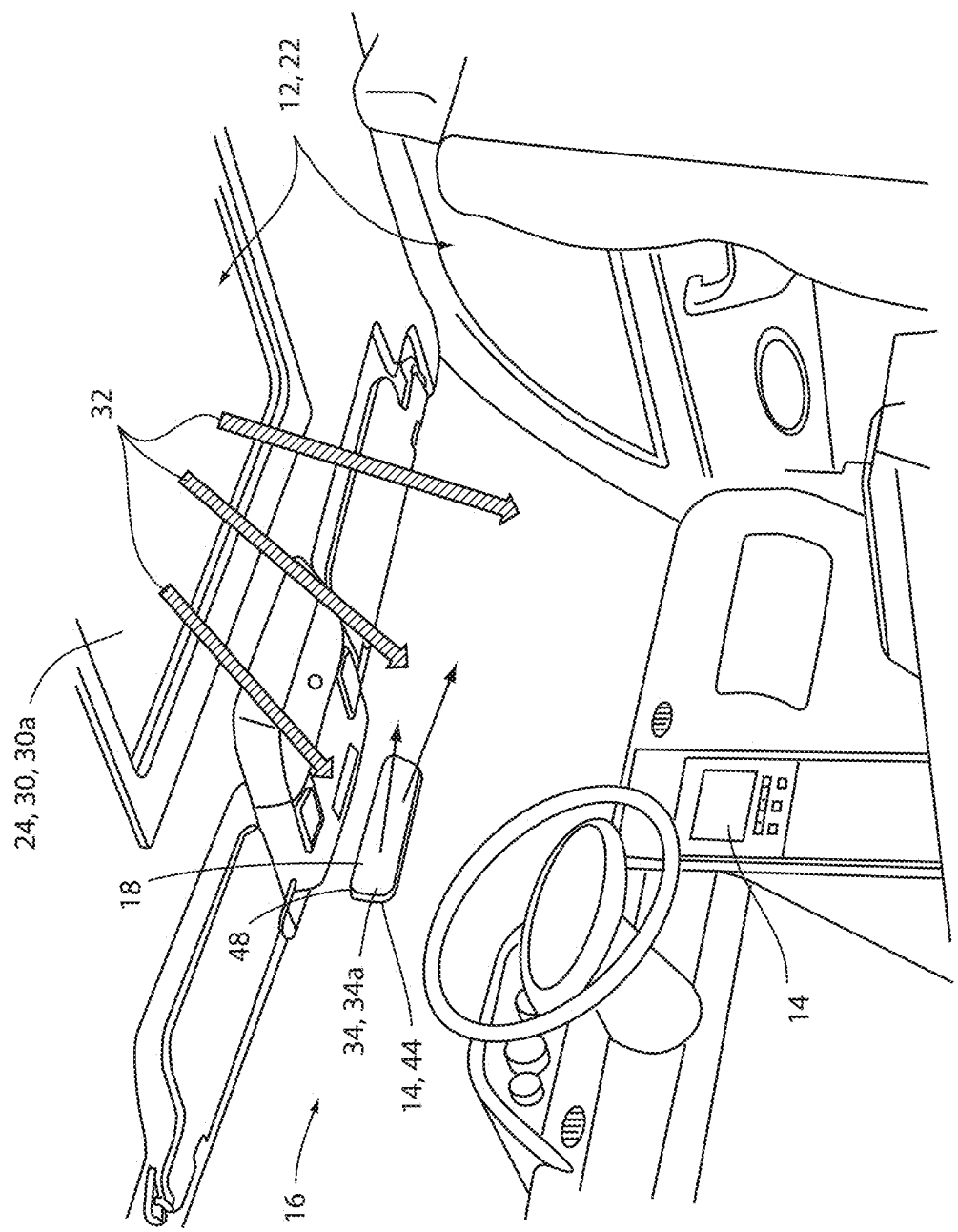
FIG. 2 is a projected view of a passenger compartment of a vehicle comprising at least one display device.

As illustrated in FIGS. 1 and 2, the display device 14 may be incorporated in the passenger compartment 16. In environments that are well-lit (e.g. daylight conditions, etc.), environmental light 26 may be received on various surfaces of the vehicle 10. Such light would typically be transmitted into the passenger compartment 16 and may limit the visibility of light emitted from the screen 18. In order to limit the detrimental effects of the environmental light 26, a first filter 30 may be included as a layer or film incorporated into the sunroof 24 and/or one or more of the windows 22. In an exemplary embodiment, the first filter 30 may be implemented as a polarizing layer or film configured to selectively pass light having a first polarization. In this way, interior light 32 transmitted into the passenger compartment 16 through the first filter 30 may only include the radiation aligned with the first polarization. Accordingly, the first filter 30 may correspond to a first polarizer oriented in a first polarization orientation 30a passing light in the first polarization.

In an exemplary embodiment, the display device 14 may comprise a second filter 34. The second filter 34 may be incorporated as a coating disposed on the screen 18 or various layers through which the light may be emitted from the display device 14. In some embodiments, the second filter 34 may correspond to a second polarizer oriented in second polarization orientation 34a. The second polarization orientation 34a may be parallel to the first polarization orientation 30a. In this way, the second filter 34 may limit reflections of the interior light 32 in the first polarization from the screen 18. Accordingly, the display device 14 may limit the artifacts and reflections reflected from the screen 18 to improve the apparent brightness of the display device 14. Specific aspects of the display device 14 and the layer on which the second filter may be disposed are discussed in detail in reference to FIG. 3.

In various embodiments, the display device 14 may correspond to a mirror display device comprising an electro-optic element 48 as described in U.S. Pat. No. 10,112,540, entitled, "Full Display Rearview Device," the disclosure of which is incorporated herein by reference in its entirety. In this configuration, the display device 14 may be configured to display a reflection of a scene rearward from the vehicle 10 and display image data, which may similarly be representative of the reflection. Additionally, the display device 14 may be configured to adjust a transmittance of the electro-optic element 48 to limit an intensity of light reflected and/or projected from the device 14.

As discussed herein, the display device 14 may correspond to a partial or full display mirror configured to display an image data through at least a portion of a mirror assembly. The display device 14 may be constructed utilizing various technologies, for example, LCD, LED, OLED, plasma, DLP, or other display technology. Examples of display assemblies that may be utilized with the disclosure may include U.S. Pat. No. 6,572,233 entitled "Rearview Mirror With Display," U.S. Pat. No. 8,237,909 entitled "Vehicular Rearview Mirror Assembly Including Integrated Backlighting for a Liquid Crystal Display (LCD)," U.S. Pat. No. 8,411,245 entitled "Multi-Display Mirror System and Method for Expanded View Around a Vehicle," and U.S. Pat. No. 8,339,526 entitled "Vehicle Rearview Mirror Assembly Including a High Intensity Display," which are incorporated herein by reference in their entirety.

The various components of the display device 14 may be contained within a housing 44. In this way, the various components discussed herein may be substantially hidden from a view of an operator 46. Accordingly, the disclosure may provide for various advanced functions from the display device 14 while maintaining the appearance of a conventional rearview mirror.

Figure 3:
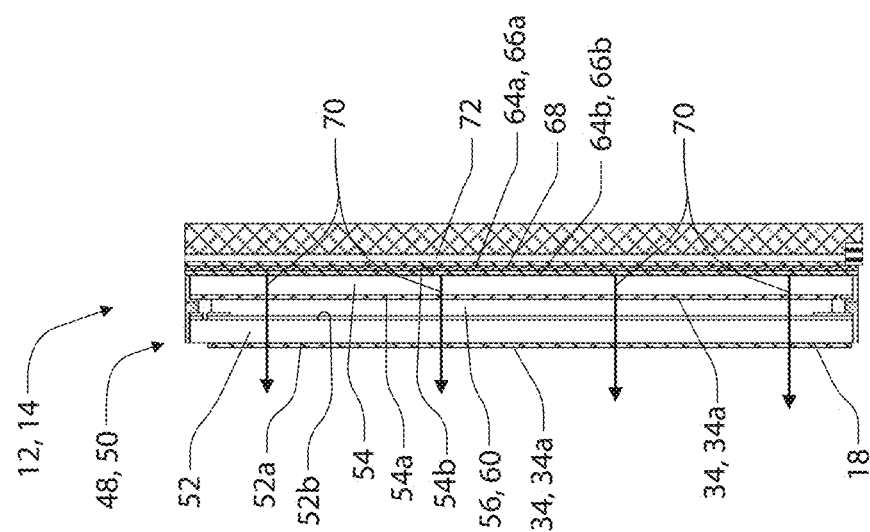
FIG. 3 is a detailed schematic view of a display device for a vehicle comprising a polarizing element configured to complement a polarizing element of at least one window or sunroof of a vehicle.
Figure 3:
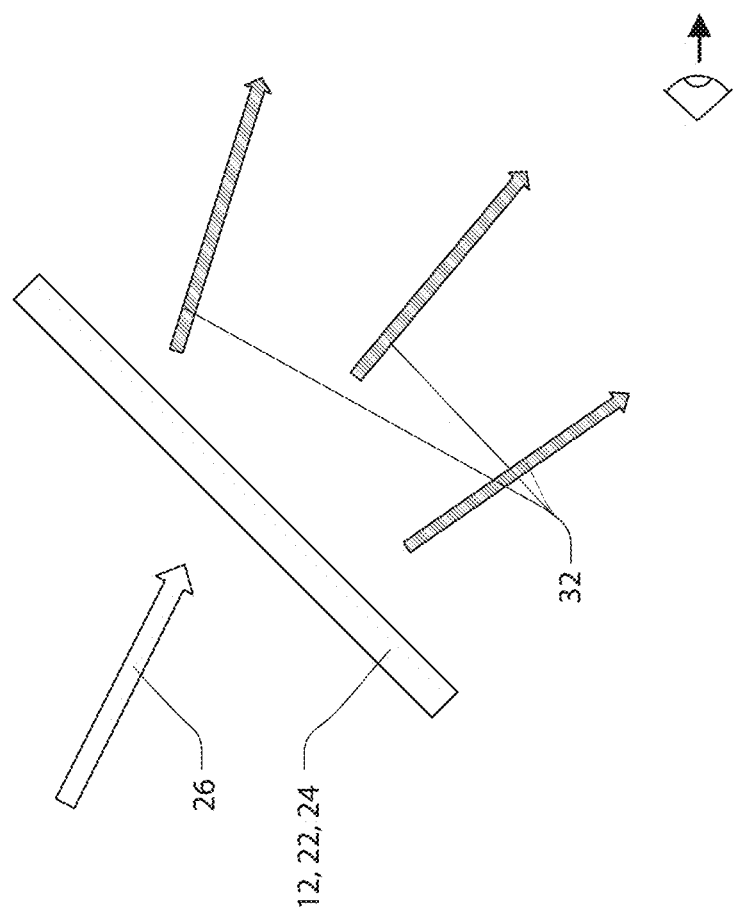

Referring to FIG. 3, a cross-sectional view of the display device 14 comprising the electro-optic element 48 is shown. The electro-optic element 48 may be partially reflective and partially transmissive and may comprise a mirror element 50. The electro-optic element 48 may include a first substrate 52 having a first surface 52a and a second surface 52b. The electro-optic element 48 may further comprise a second substrate 54 having a third surface 54a and a fourth surface 54b. The first substrate 52 and the second substrate 54 may define a cavity 56 and may be substantially parallel. The first surface 52a and the third surface 54a may be oriented toward a front surface of the electro-optic element 48. The second surface 52b and the fourth surface 54b may be oriented toward a rear surface of the electro-optic element 48 or the housing 44. In this configuration, the contents of the housing 44 may be significantly hidden from view by the electro-optic element 48.

The cavity 56 may contain an electro-optic medium 60, such as, but not limited to, an electrochromic medium. The cavity 56 may be completely or partially filled with the medium 60. The display device 14 may be in communication with a dimming controller via electrical contacts and may comprise various seals to retain the medium 60 in the cavity 56. In this configuration, the display device 14 may correspond to an electrochromic mirror element configured to vary in reflectivity in response to a control signal received from the dimming controller via the electrical contacts. The control signal may change an electrical potential supplied to the electro-optic element 48 to control the reflectivity. In a conventional electro-optic assembly, a transflective coating may typically be disposed on the third surface 54a. The transflective coating may typically comprise a layer containing silver along with additional layers, such as metal, dielectric, and/or transparent conducting oxides located above or below the silver comprising layer or both.

In various embodiments, the display device 14 may comprise a first display polarizer 64a and a second display polarizer 64b, which may be a component of a liquid crystal display (LCD). The display polarizers 64a, 64b may comprise a first display polarizer 64a arranged in a first display polarization orientation 66a and a second display polarizer 64b arranged in a second display polarization orientation 66b. The first display polarizer 64a and the second display polarizer 64b may be arranged on opposing sides of a liquid crystal element 68. Additionally, the first display polarization orientation 66a may be orthogonal or rotated 90 degrees about a projection vector 70 relative to the second display polarization orientation 66b. In this way, the display device 14 may control the light emitted from a backlight 72. Additionally, the second polarization orientation 34a of the second filter 34 may be arranged in a complementary orientation to the second display polarization orientation 66b, such that light from the display device 14 may be transmitted therethrough and displayed on the screen 18.

As discussed herein, each of the filters or polarization filters, and/or polarizers may be referred to using the reference terms first, second, third, etc. For example, the first filter and the second filter are generally discussed in reference to the first filter 30 and the second filter 34. Additionally, a third filter and a fourth filter may be described to reference the first display polarizer 64a and the second display polarizer 64b. However, the terms first, second, third, etc. may only be utilized to clearly distinguish the filters from each other and should not be considered limiting to a designation of a specific number, order, or priority of the devices that are discussed herein. Accordingly, the numerical references are only utilized for clarity and should not be considered limiting to the disclosure.

As previously discussed, the first filter 30 may be included as a layer or film incorporated into the sunroof 24 and/or one or more of the windows 22. In an exemplary embodiment, the first filter 30 may be implemented as a polarizing layer or film configured to selectively pass interior light 32 having a first polarization. The second filter 34 may be incorporated as a coating disposed on the screen 18 or various layers through which light may be emitted from the display device 14. In operation, the second filter 34 may limit reflections of the interior light 32 from the screen 18. In this way, the display device 14 may limit the artifacts and reflections reflected from the screen 18 to improve the apparent brightness of the display device 14.

Referring now to FIGS. 1-3, the display device 14 may generate display data demonstrated in FIG. 3 emitted along the projection vector 70. The display data may depict visual information (e.g., video, graphic data, etc.) and may be transmitted at display light through the display surface (e.g., the first surface 52a) as polarized light having a first polarization. The polarization of the display light may result from the passage of the display light through the display polarizers 64. Accordingly, the first polarization of the display light may be aligned with the second polarization orientation 34a of the second filter 34. In this configuration, the display light may be transmitted through the electro-optic element 48 and the second filter 34 for display in the passenger compartment 16.

In coordination with the display light from the display device 14, the disclosure may provide for the control and restriction of light from entering the vehicle 10, such that environmental light entering the passenger compartment 16 does not result in unwanted reflections from the display device 14. If not inhibited, such reflections from the display device 14 may diminish the appearance of the display light and make viewing the visual information more challenging. Accordingly, the disclosure provides for filtering the environmental light 26 that is transmitted into the passenger compartment 16 through the first filter 30 and only passing light having a first polarization into the passenger compartment 16 from the light-transmissive panel 12. The light having the first polarization may impinge upon the surface of the display device 14 and be transmitted or received by the electro-optic element 48 and transmitted through the second filter 34. The light having the first polarization may then be reflected from a mirrored surface (e.g. the transflective coating on the third surface 54a). However, the reflected light may be inhibited from passing back through the second filter 34 due to a shift in the polarization. Accordingly, the light received by the display device 14 having the first polarization may be prevented or inhibited from reflecting back into the passenger compartment 16, thereby limiting undesirable reflections from being reflected from the display device 14 and improving the appearance of the display light.

Referring now to FIG. 3, the second filter 34 may be applied as a coating, film, or various forms of transmissive optical elements on various surfaces of the electro-optic element 48, the display screen 18, and/or the display device 14. In some embodiments, the second filter 34 may be disposed on one of the first surface 52a, the second surface 52b, the third surface 54a, and/or the fourth surface 54b As discussed in reference to the following exemplary embodiments, the second filter 34 may be disposed on the first surface 52a or the third surface 54a. Accordingly, the display device 14 may be implemented in various ways to provide for the improved display and reduction in reflections visible on the screen 18.

In some embodiments, the first filter 30 (e.g. a first transmissive polarizer) may be incorporated as a layer of the sunroof 24 and oriented to emit light in the first polarization orientation 30a. The second filter 34 (e.g. a second transmissive polarizer) may be disposed on the first surface 52a of the first substrate 52 with the second polarization orientation 34a oriented parallel to the first polarization orientation 30a. Additionally, the second polarization orientation 34a may be arranged parallel to the second display polarization orientation 66b. In this configuration, reflections may be limited by preventing reflections of light in the first polarization from reflecting from the screen 18.

In some embodiments, the first filter 30 may correspond to a reflective polarizer. In such applications, the first filter 30 may similarly be incorporated as a layer of the sunroof 24 and oriented to emit light in the first polarization orientation 30a. The second filter 34 may also correspond to a reflective polarizer on the third surface 54a of the second substrate 54 with the second polarization orientation 34a oriented parallel to the first polarization orientation 30a. Alternatively or additionally, the second filter 34 may be disposed on the fourth surface 54b while providing similar benefits. In such embodiments, the second polarization orientation 34a may also be arranged parallel to the second display polarization orientation 66b. In this configuration, reflections of the interior light 32 may be similarly limited by preventing reflections of light in the first polarization from reflecting from the screen 18.

In embodiments wherein the second filter 34 is disposed on the fourth surface 54b, the successful attenuation of the reflected light into the passenger compartment 16 may be achieved without the need for additional filters disposed on the remaining surfaces of the electro-optic element 48. However, in some implementations, utilizing filters on one or more of the first surface 52a, the third surface 54a, and/or the fourth surface 54b may be utilized to provide further attenuation of the polarization of light to be filtered. Accordingly, the teachings of the disclosure may be applied to a variety of display devices and filtering schemes without departing from the spirit of the disclosure.

As discussed herein, each of the filters (e.g., the first filter 30, the second filter 34, etc.) may be configured to preferentially pass a first polarization of light while inhibiting or blocking a second polarization of light. As will be understood by those having skill in the art various devices configured to selectively pass a first polarization of light may not provide for complete attenuation of a second polarization of light described herein as being filtered (e.g. reflected or blocked). Accordingly, the filters and filtering operations discussed herein may be accomplished by a variety of devices, films, coatings, substrates, etc. For example, the polarizing filters discussed herein may include but are not limited to birefringent polarizers, thin-film polarizers, wire-grid polarizers, liquid crystal polarizers, etc. A liquid crystal polarizer as discussed herein be configured to control the transmission of one or more polarization of light by including polymers, inorganic particles, or dichroic dye within the liquid crystal matrix. Accordingly, the filters layers, filters, and filtering operations may be achieved by a variety of elements or devices that may be implemented to suit the desired application.

Figure 4:
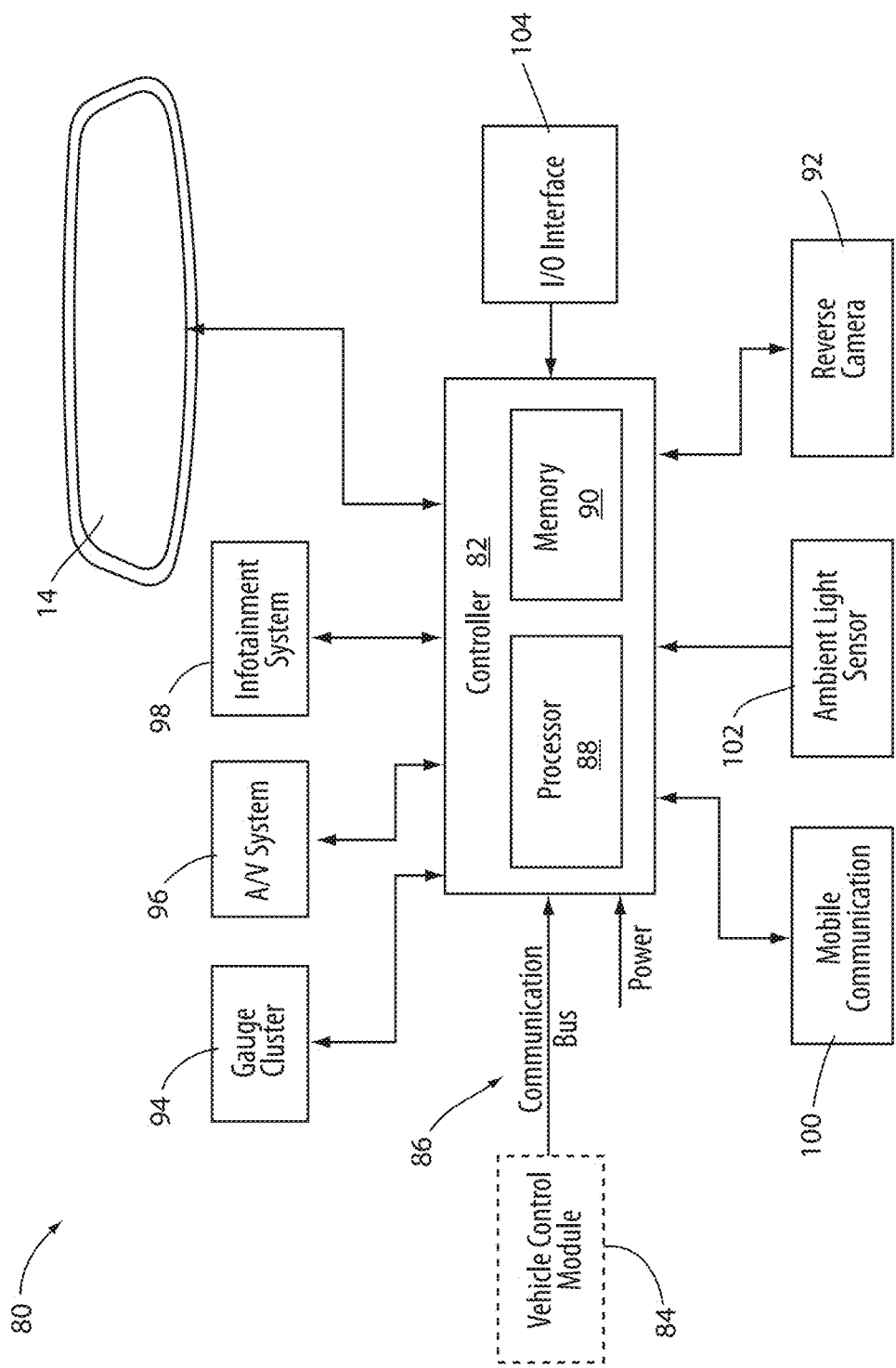
FIG. 4 is a block diagram of a display system for a vehicle in accordance with the disclosure.

Referring now to FIG. 4, a block diagram of a display system 80 comprising the display device 14 is shown. The system 80 may comprise a controller 82 in communication with display device 14. The controller 82 and may also be in communication with a vehicle control module 84 via a communication bus 86 of the vehicle 10. The communication bus 86 may be configured to deliver signals to the controller 82 identifying various vehicle states. For example, the communication bus 86 may be configured to communicate to the controller 82 a drive selection of the vehicle, an ignition state, a door open or ajar status, or a remote activation of the display device 14. Such information and control signals may be utilized by the controller 82 to activate or adjust various states and/or control schemes of the display device 14 as discussed herein.

The controller 82 may comprise a processor 88 having one or more circuits configured to receive the signals from the communication bus 86 and control the display device 14. The processor 88 may be in communication with a memory 90 configured to store instructions to control operations of the display device 14. For example, the controller 82 may be configured to store one or more graphics, operations, and/or operating steps associated with the operation display device 14. The controller 82 may further be in communication with a reverse camera 92 or any other form of vehicle camera system. The controller 82 may receive image data from the reverse camera 92 corresponding to a rearward-directed field of view relative to the vehicle 10. In this configuration, the display device 14 may provide for the rearward-directed field of view to be displayed. The controller 82 may further be in communication with one or more of a gauge cluster 94, an audio/video (A/V) system 96, an infotainment system 98, a media center, a vehicle computing system, and/or various other devices or systems of the vehicle 10.

In some embodiments, the controller 82 may be in communication with a mobile communication system 100. The mobile communication system 100 may be configured to communicate via various mobile communication protocols. Wireless communication protocols may operate in accordance with communication standards including, but not limited to Institute of Electrical and Electronic Engineering (IEEE) 802.11 (e.g., WiFi™); Bluetooth®; advanced mobile phone services (AMPS); digital AMPS; global system for mobile communications (GSM); code division multiple access (CDMA); Long Term Evolution (LTE or 4G LTE); local multi-point distribution systems (LMDS); multi-channel-multi-point distribution systems (MMDS); RFID; and/or variations thereof.

The controller 82 may further be in communication with an ambient light sensor 102. The ambient light sensor 102 may be operable to communicate a light condition, for example, a level brightness or intensity of the ambient light proximate the vehicle 10. In response to the level of the ambient light, the controller 82 may be configured to adjust a light intensity output from the screen 18. In this configuration, the operator of the controller 82 may adjust the brightness of the display device 14.

The controller 82 may further be in communication with an interface 104 configured to receive one or more inputs configured to control at least one of the display device 14 and the reverse camera 92. In some embodiments, the interface 104 may be combined with one or more devices of the vehicle 10. For example, the interface 104 may form a portion of the gauge cluster 94, the A/V system 96, the infotainment system 98, a display console and/or various input/output devices that may commonly be utilized in automotive vehicles (e.g. a steering switch, steering wheel controls, etc.). In this way, the disclosure provides for various control schemes for implementing the display device 14 in a vehicle.

The electro-optic element 48 may be an electrochromic element or an element, such as a prism. One non-limiting example of an electrochromic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity is affected by electric current, such that when an electrical current is applied to the material, the color or opacity changes from a first phase to a second phase. The electrochromic component may be a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-Selected Color," U.S. Pat. No. 6,037,471 entitled "Electrochromic Compounds," U.S. Pat. No. 6,141,137 entitled "Electrochromic Media for Producing a Preselected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration-Enhanced Stability, Process for the Preparation Thereof and Use In Electrochromic Devices," and U.S. Pat. No. 6,519,072, entitled "Electrochromic Device"; and International Patent Application Publication Nos. WO 98/42796 entitled "Electrochromic Polymeric Solid Films, Manufacturing Electrochromic Devices Using Such Solid Films, and Processes for Making Such Solid Films and Devices," and WO 99/02621 entitled "Electrochromic Polymer System," which are herein incorporated by reference in their entirety.

The present disclosure may be used with a mounting system such as that described in U.S. Pat. Nos. 8,814,373; 8,201,800; 8,210,695; 8,925,891; and 9,174,577; U.S. Patent Application Publication No. 2012/0327234; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,814,373; 8,646,924; 8,643,931; 8,264,761; and 8,885,240; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A display system for a vehicle comprising:
    a display device disposed inside a passenger compartment of the vehicle, wherein the passenger compartment is configured to receive light from a first polarization filter included as a film, layer, or coating of a window or a sunroof of the vehicle, the first polarization filter oriented in a first orientation and the display device is configured to display video data from a display screen, the display device comprising:
    an electro-optic element comprising a plurality of substrates; and
    a second polarization filter disposed on at least one of the plurality of substrates; and
    wherein the second polarization filter is oriented in a second orientation parallel to the first orientation.

2. The display system according to claim 1, wherein the second polarization layer comprises a thin film or coating.

3. The display system according to claim 1, wherein the plurality of substrates comprises a first substrate comprising a first surface and a second surface, and a second substrate comprising a third surface and a fourth surface, and wherein the electro-optic element comprises an electro-optic medium disposed between the first substrate and the second substrate.

4. The display system according to claim 3, wherein the second polarization filter is disposed on at least one of the first surface, the third surface, and the fourth surface of the plurality of substrates.

5. The display system according to claim 3, further comprising a transflective coating disposed on the third surface of the electro-optic element.

6. The display system according to claim 3, wherein the display device comprises a backlight and a liquid crystal element.

7. The display system according to claim 6, wherein the display device further comprises a third polarization filter oriented in a third orientation and disposed between the backlight and the liquid crystal element.

8. The display system according to claim 7, wherein the display device further comprises a fourth polarization filter oriented in a fourth orientation and disposed between the liquid crystal element and the electro-optic element.

9. The display system according to claim 8, wherein the third orientation of the third polarization filter is arranged perpendicular to the fourth orientation of the fourth polarization filter.

10. The display system according to claim 8, wherein the fourth orientation of the fourth polarization filter is arranged parallel to the second orientation of the second polarization filter.

11. The display system according to claim 1, wherein the first polarization filter and the second polarization filter comprise reflective polarizers.

12. The display system according to claim 1, wherein the first polarization filter and the second polarization filter comprise transmissive polarizers.

13. A method for displaying visual information on a display disposed in a passenger compartment of a vehicle, the method comprising:
    receiving filtered light comprising a first polarization in the passenger compartment from a light-transmissive panel, wherein the light-transmissive panel is an exterior window of the vehicle that transmits the filtered light from environmental light proximate to the vehicle;
    receiving the filtered light of the first polarization at a display surface of a display device in the passenger compartment;
    transmitting the filtered light having the first polarization through a first polarization filter of an electrochromic element of the display;
    reflecting the filtered light from a mirror element of the display as reflected light; and
    inhibiting the transmission of the reflected light into the passenger compartment by blocking the reflected light with the first polarization filter.

14. The method according to claim 13, further comprising:
    generating display light having the first polarization depicting the visual information; and
    transmitting the display light through the electrochromic element and the second polarization filter for display in the passenger compartment.

15. The method according to claim 13, further comprising:
    receiving light on a light-transmissive panel of the vehicle; and
    transmitting the first polarization of the filtered light through a second polarization filter of the light-transmissive panel into the passenger compartment.

16. A display system for a vehicle comprising:
    a light-transmissive panel of the vehicle comprising a first polarization filter oriented in a first orientation, wherein the light-transmissive panel comprises a window or sunroof of the vehicle;
    a display device disposed inside a passenger compartment of the vehicle and configured to display video data on a display screen, the display device comprising:
    an electro-optic element comprising:
        a first substrate comprising a first surface and a second surface; and a second substrate comprising a third surface and a fourth surface; and
        an electro-optic medium disposed between the first substrate and the second substrate; and
        a second polarization filter disposed on at least one of the first surface, the third surface, and the fourth surface; and
    wherein the second orientation is arranged parallel to the first orientation.

17. The display system according to claim 16, wherein the display device is configured to generate display light polarized at a third orientation, wherein the third orientation is parallel to the first orientation and the second orientation.

18. The display system according to claim 16, wherein the first polarization filter and the second polarization filter comprise reflective polarizers or transmissive polarizers.

\* \* \* \* \*